Patented June 14, 1932

1,863,277

UNITED STATES PATENT OFFICE

WILLIAM JAMES McGROARTY, OF TORONTO, ONTARIO, CANADA, ASSIGNOR TO NATIONAL FOODS LIMITED, OF TORONTO, ONTARIO, CANADA, A CORPORATION OF CANADA

PROCESS OF MAKING BREAD, CAKES, AND OTHER PRODUCTS OF A SIMILAR NATURE

No Drawing. Application filed August 20, 1929. Serial No. 387,266.

This invention relates to a method of making bread, cakes, and other products of a similar nature and increasing the anti-rachitic properties of the baked product, which comprises preparing an emulsified mixture of ergosterol containing ingredients to be incorporated in the dough, subjecting the mixture to the direct action of ultra-violet rays, for activating it, and then combining it with the flour.

It is known from the work of previous investigators that rickets is caused by a deficiency in the body of the anti-rachitic vitamine D and that to remedy that deficiency the vitamine must be included in the food; and it is also known that when food substances rich in ergosterol are activated by irradiation they definitely become anti-rachitic.

Ergosterol is widely distributed in nature and occurs in comparative abundance in fungi, and in yeast, wheat germ oils, and in nearly all fats, oils, and lipoids in general. It has been studied in its application for the prevention and cure of rickets and has been found to be in its activated state a powerful specific for that disease and for allied disturbances of mineral metabolism in the human system. Bread, which is recognized as one of the principal diets of the human race, is known to be deficient in vitamine D and various methods have been devised for imparting to it and to other products of a similar nature anti-rachitic properties by irradiating the dough itself during the mixing stage of the manufacture. Scientific investigation has established, however, that such methods of irradiation are not feasible as the dough is largely opaque to ultra-violet rays and bread made from dough subjected to those rays has no anti-rachitic properties and is in no respect different to bread made from untreated dough. Having confirmed those facts by my own investigations I devised a method of imparting anti-rachitic properties to bread, cakes, and other like products by subjecting a mixture of certain of the ingredients to be incorporated in the dough to the direct action of ultra-violet rays and activating this mixture before combining it with the flour and found a marked improvement in the anti-rachitic and other qualities of the resulting products.

In one embodiment of the invention I prepared an emulsion of salt, sugar, powdered whole milk, hydrogenated shortening, and mineral yeast food by dissolving the salt and sugar in warm water, adding to this solution the powdered milk and yeast food, whipping this mixture, emulsifying it and adding melted hydrogenated shortening to it during the initial stage of the emulsification and I subjected the mixture during the emulsification to the direct action of ultra-violet rays until activated. Vegetable shortening was used on account of its relatively high ergosterol content, and whole milk was used on account of its butter fat. Tests were then made on commercial scale and the amount of hydrogenated shortening was increased but the quantities of the other ingredients were undisturbed.

Tests were also made as regards temperature and the quantity of water, and it was ascertained that with double the quantity of water to sugar and salt and with the temperature, regulated to substantially, 100° F., the vitamin activity was preserved and better results were obtained than by using a less quantity of water or higher or lower temperatures.

A formula for a mixture of ingredients, which gave satisfactory results was salt, 1.75 per cent, sugar 2.00 per cent, powdered whole milk 2 per cent, hydrogenated vegetable shortening 4 per cent, mineral yeast food 0.25 per cent and yeast 2 per cent. In preparing an emulsion for 100 pounds of flour according to this formula, the procedure is as follows:—Dissolve 1¾ pounds salt and 2 pounds sugar in 7½ pounds water, boil and cool to 100° F., and then add to this solution 2 pounds of powdered whole milk and 4 ounces of yeast food, whip the mixture for about one minute and emulsify it. During the first five minutes of the emulsification add 4 pounds of melted hydrogenated shortening. Continue the emulsification for a further period of five minutes and subject the mixture during the whole stage of the emulsifying step of the process, to the action of ultra-violet rays.

Prepare a suspension of two pounds of yeast in four pounds of water, thoroughly agitate this mixture, and subject it to the direct action of ultra-violet rays for about five minutes during the agitation. Put the remainder of the water into the mixer, followed by the yeast suspension and flour and then at the commencement of the mixing, incorporate the emulsified mixture in the dough.

In all tests where an emulsion of these ingredients was activated by ultra-violet rays and used in the manufacture of bread, the baked product had a silkier texture, was whiter in the crumb, and richer in antirachitic properties than bread made by other known methods.

Having fully described my invention what I claim is new and desire to secure by Letters Patent is:—

1. A method of making bread, cakes, and other products of a similar nature which comprises preparing an emulsified mixture of salt, sugar, milk, shortening, and yeast food, irradiating this emulsified mixture during emulsification with ultra-violet rays, preparing a yeast suspension and irradiating it with ultra-violet rays, adding the yeast suspension to the flour and water, and then incorporating the emulsified mixture in the dough at the commencement of mixing.

2. A method of making bread, cakes, and other products of a like nature which comprises preparing an emulsified mixture of ergosterol containing ingredients including salt 1.75 per cent, sugar 2 per cent, powdered whole milk 2 per cent, hydrogenated vegetable shortening 4 per cent and yeast food 0.25 per cent, regulating the temperature of the mixture to substantially, 100° F. and irradiating the mixture during emulsification with ultra-violet rays, preparing a suspension of 2 per cent yeast and irradiating it with ultra-violet rays, combining the yeast suspension with the flour, and then incorporating the emulsified mixture in the dough at the commencement of the mixing.

Signed at the said city of Toronto, this 7th day of August, 1929.

WILLIAM JAMES McGROARTY.